(12) United States Patent
Sharpe

(10) Patent No.: US 10,544,600 B1
(45) Date of Patent: *Jan. 28, 2020

(54) BALLASTED ATTACHMENT FOR TEMPORARY TRUSS STRUCTURES

(71) Applicant: United Staging & Rigging, LLC, Haverhill, MA (US)

(72) Inventor: Jonathan Sharpe, Newmarket, NH (US)

(73) Assignee: United Staging & Rigging, LLC, Haverhill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,602

(22) Filed: Jun. 24, 2019

Related U.S. Application Data

(63) Continuation of application No. 15/820,779, filed on Nov. 22, 2017, now Pat. No. 10,378,231.

(51) Int. Cl.
*E04H 12/22* (2006.01)
*F16M 11/20* (2006.01)
*E04H 12/10* (2006.01)

(52) U.S. Cl.
CPC ..... *E04H 12/2238* (2013.01); *E04H 12/2246* (2013.01); *F16M 11/2035* (2013.01); *E04H 12/10* (2013.01)

(58) Field of Classification Search
CPC . E04H 12/2238; E04H 12/2246; E04H 12/08; E04H 12/10
See application file for complete search history.

(56) References Cited

U.S. PATENT DOCUMENTS

| 5,623,786 | A  | * | 4/1997  | DeMeyer   | E04B 7/16     |
|           |    |   |         |           | 403/79        |
| 6,141,928 | A  | * | 11/2000 | Platt     | E04F 11/1812  |
|           |    |   |         |           | 256/65.14     |
| 6,464,196 | B1 | * | 10/2002 | Crookham  | E04G 1/24     |
|           |    |   |         |           | 248/519       |
| 7,219,873 | B2 | * | 5/2007  | Harwood   | E04H 12/2261  |
|           |    |   |         |           | 181/171       |
| 7,533,506 | B2 | * | 5/2009  | Platt     | E04H 12/2261  |
|           |    |   |         |           | 52/296        |
| 8,220,213 | B2 | * | 7/2012  | Jolly     | E02D 27/42    |
|           |    |   |         |           | 52/292        |
| 8,499,513 | B2 | * | 8/2013  | Jolly     | E02D 27/42    |
|           |    |   |         |           | 52/292        |
| 8,695,305 | B2 | * | 4/2014  | Gallagher | E04H 12/2238  |
|           |    |   |         |           | 52/655.1      |
| 9,284,744 | B2 | * | 3/2016  | Patterson | E04H 12/2269  |

(Continued)

*Primary Examiner* — Adriana Figueroa
(74) *Attorney, Agent, or Firm* — Clocktower Law LLC; Eric J. Heels; Michael A. Bartley

(57) ABSTRACT

Ballasted Attachment for Temporary Truss Structures or BATTS are used to support Temporary structures typically built in the live event, trade show, and special event marketplace. BATTS provide a quickly deployed, leveled and stable base for which one can mount aluminum box truss too. This allows tower construction equal to the capacity of the truss itself and a flexible outrigger attachment in which many engineering requirements can be achieved. BATTS provide a ballast point to resist the overturn moment and uplift moment of concert roofs and other system that are exposed to environmental conditions. BATTS are constructed from steel and aluminum and possess substantial self-weight.

19 Claims, 9 Drawing Sheets

(56) References Cited

U.S. PATENT DOCUMENTS

| | | | | |
|---|---|---|---|---|
| 9,499,954 B2* | 11/2016 | Shi | ............... | E02D 27/42 |
| 9,657,491 B1* | 5/2017 | Mansueto | ............ | E04H 12/2238 |
| 9,803,331 B2* | 10/2017 | Shi | ............... | E02D 27/42 |
| 9,863,161 B2* | 1/2018 | Anderson | ............ | E04H 12/2246 |
| 10,054,248 B2* | 8/2018 | Louden | ............ | B65D 25/00 |
| 10,100,484 B2* | 10/2018 | Shi | ............... | E02D 27/42 |
| 2014/0059957 A1* | 3/2014 | Stark | ............ | E02D 27/42 |
| | | | | 52/292 |
| 2015/0308140 A1* | 10/2015 | Clifton | ............ | F03D 9/007 |
| | | | | 248/346.2 |
| 2017/0347533 A1* | 12/2017 | Volin | ............ | A01G 9/02 |
| 2018/0008077 A1* | 1/2018 | Watson | ............ | A47G 33/12 |
| 2018/0251996 A1* | 9/2018 | Roy | ............ | E04H 12/2261 |

* cited by examiner ible patent application is a continuation of and
BALLASTED ATTACHMENT FOR TEMPORARY TRUSS STRUCTURES

CROSS-REFERENCE TO RELATED APPLICATIONS

This utility patent application is a continuation of and claims priority from U.S. patent application Ser. No. 15/820,779, filed Nov. 22, 2017, titled "BALLASTED ATTACHMENT FOR TEMPORARY TRUSS STRUCTURES", naming inventor Jonathan Sharpe.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017, United Staging & Rigging, LLC.

BACKGROUND

Field of Technology

This relates to ballast and bases, and more particularly to support of entertainment oriented rigging and outdoor structures, as well as any temporary structures using theatrical trusses.

Background

Temporary Structures are an increasing part of the special event, live event and television industry. These structures need to overcome several engineering hurdles to accomplish the visions or technical requirements of the overall event design. One of the tools used to overcome these obstacles is Ballast. Ballast can be used in several different ways to offer stability to a structure. Ballast can be used to prevent uplift, sliding, axial loading, or overturning to name a few. Connection to the Ballast can be done in many ways but it must be a secure connection. Connections at the bottom of a tower often are made in the form of a Spigot connection or Bolted connection through the end plates of the tower itself. These connection points offer little or no adjustment and therefore the base must be placed in a predetermined position with extreme accuracy. The placement accuracy is most critical when two or more towers are connected by a horizontal span. Gaining exact placement with a 1,000 lbs or greater base is a slow and tedious process. Time is a critical factor in the entertainment construction process and a great amount of time can be lost with measuring and placing of heavy bases.

There are two products currently on the market. The first and most closely related is the G-Block. The G-block from Gallagher Staging is used as a base for aluminum stage trussing. The G-block is a steel box that has multiple bolt hole locations for attaching aluminum stage trusses. The G-block has fixed locations of the bolt holes. G-blocks work well when connecting a single tower. However, the weight of the G-block makes it hard to position accurately and therefore when connecting more than one G-block to an aluminum truss structure using the G-block becomes very cumbersome and time consuming. The G-block is available in a few different sizes; the different sizes allow the G-block to offer different weight options. However, this makes it hard to pre-plan for onsite changes or adjustments to plan. The choice that is often made well in advance of delivery is the size and weight available on site. The only option to increase weight is to change out the base, which is seldom achievable, or add more G-blocks, which increases event costs and introducing time consuming difficult configurations.

The other competitive item on the market today is ballast offered by Stage-CMDR. These ballasts are very like the G-Block however they offer fewer locations to connect truss. The reduced amount of truss attachment locations makes this ballast even harder to use than the G-block.

Description of Prior Art

U.S. Pat. No. 5,085,396 "Bed Structure for Supporting Engines and Auxiliary Objects" (Mansson, Feb. 4, 1992) discloses, in the Abstract, "The invention relates to a bed structure for supporting driving and driven units, such as internal combustion engines and generators for instance. The bed structure comprises a first frame section which serves as a transport frame and bed for the engine, and a second frame section which can be moved between a retracted transport position and an extended position in which it serves as a bed for an auxiliary unit, such as a generator."

U.S. Pat. No. 5,833,207 "Supports for Transformers or Other Equipment" (Hagenhoff et al., Nov. 10, 1998) discloses, in the Abstract, "A support or pad for equipment, especially electrical transformers, is disclosed. The pad is designed to permit multi-directional access to its underside; consequently, it need not be positioned specially once a transformer is mounted to it, but rather is accessible in almost any upright orientation to the tines of a fork-lift truck. In some embodiments the tine-receiving recesses do not abut an opening for electrical cables attached to the transformer, the opening instead being bordered by sections of the full depth of the pad. The multiple recesses of the pad thus fail to communicate with the opening, blocking any path along the underside from the periphery of the pad to the cable opening itself."

U.S. Pat. No. 5,944,413 "Apparatus and Method for Moveable Lighting" (Crookham et al., Aug. 31, 1999) discloses, in the Abstract, "An apparatus and method for moveable lighting of large areas includes moveable bases upon which can be mounted light poles and light fixtures that elevate lights to a substantially high level. Each base has a size and mass that allows the pole and light fixture(s) to freely stand, including against normal environmental conditions without tipping. The base can be moved from location to location and transported with conventional equipment eliminating dedicated trailers or trucks and eliminating a substantial labor and time to erect portable tower."

U.S. Pat. No. 6,186,468 B1 Mounting Pad Apparatus for Supporting and Moving an Electrical Power Transformer While Positioned Theron (Robert R. Schlegel, Cranbury, N.J. (US) Feb. 13, 2001) discloses, in the Abstract, "An improved mounting pad apparatus is disclosed made of a plastic material for supporting an electrical power transformer and maintaining it spaced from the surrounding ambient ground environment which is usually turf. The mounting pad is formed of a load supporting deck positioned upon a cellular subframework with side walls extending therearound and a base flange extending outwardly therefrom for stability. One more rigid bars are selectively positionable within various slots defined in the cellular subframework for strengthening and stiffening thereof in various orientations. These rigid bars can extend parallel or perpendicular with respect to one another for various applications where different types of strengthening parameters are required. The cellular subframework also selectively can define a plurality of forklifting slots which can extend therethrough and through the side walls to facilitate lifting and movement of the mounting pad apparatus even with a normally quite heavy electrical power transformer positioned thereon. Multiple forklifting slots can be defined by the cellular subframework at various orientations with respect to one another to facilitate use thereof in relatively inaccessible locations."

U.S. Pat. No. 6,464,196 B1 Apparatus and Method for a Temporary Spread Footing (Joe P. Crookham, Oskaloosa, Iowa (US); David M. Crookham, Oskaloosa, Iowa (US); James A. Whitson, Oskaloosa, Iowa (US); Thomas A. Stone, University Park, Iowa (US); Gregory N. Kubbe, Ottumwa, Iowa (US); Walter R. Tippett, Oskaloosa, Iowa (US) Oct. 15, 2002) discloses, in the Abstract, "An apparatus and method for providing a temporary spread footing for supporting a variety of different vertically extending structures. The apparatus includes a frame with a top and bottom. The frame can have a substantial space or void in between the top and bottom into which weights or devices can be placed. A connection on top of the base removably connects to the structure to be supported. Outriggers could also be used to substantially increase the overturning moment resistance of the base. The outriggers can be removable or retractable so that for transportation, the base has minimum dimensions. The method includes predetermining the needed weight and overturning moment resistance for a particular application and transporting the base to the site and thereafter adding weight and adjusting outriggers to match the pre-determined needed overturning moment resistance."

U.S. Pat. No. 7,543,793 B2 Generator Set Tank and Enclosure with Adjustable Mounting System (Wayne A. Graham, S80 W20570 Tyler Dr., Muskego, Wis. (US) 53150; Jeremy Zurich, 1216 Memorial Dr., Apt. 14, Milwaukee, Wis. (US) 53217; David Kranz, 401 Cambridge St., Waukesha, Wis. (US) 53188 Jun. 9, 2009) discloses, in the Abstract, "The present invention is a generator set tank and enclosure that includes a number of adjustable generator support assemblies that enable the tank and enclosure to be configured for use with generators of various sizes. The support assemblies include mounting channels configured to be secured to the tank in a variety of locations, and each channel includes a number of support platforms therein which can be adjustably positioned on the channels to further adjust the configuration of the support assemblies. Also, the tank and enclosure are configured with multiple fittings, attachments, and access points in order to enable both the tank and enclosure to be fully customizable for use with generators of various sizes."

U.S. Pat. No. 8,789,987 B2 Base for Masts (Jiirgen Nolle, Rheinberg (DE) Jul. 29, 2014) discloses, in the Abstract, "The invention relates to a base (1), in particular for light masts, comprising a housing (7) with a base surface (10) which can be filled with a medium. In order to ensure improved stability and to avoid additional grounding measures, an embodiment is chosen according to the invention in which the housing (7) is not electrically conductive and has a holding opening (21) for a mast (2) which is not round and is composed of non-conductive material. In this case, a mast (2) which is not round avoids lateral inclination of the mast (2), thus making it possible to ensure secure installation."

U.S. Patent Application Publication Pub. No.: US 2015/0023017 A1 Light Tower (Paul S. Smith, Drayton Valley (CA); Danny S. Smith, Drayton Valley (CA); Gregory A. Hartman, Drayton Valley (CA) Jan. 22, 2015) discloses, in the Abstract, "A portable, low-energy light tower to provide high, bright light having ground-engaging elements, a telescoping mast secured to the base and the mast having a pivot, the telescoping mast being rotatable about the pivot between a transport position and an operating position, and LED lighting elements at the top end of the telescoping mast. An electrically operated linear actuator mounted on the telescoping mast extends and retracts the telescoping mast through a system of cables and pulleys."

U. S. Patent Application Publication Pub. No.: US 2016/0258601 A1 (Matthew GOWANLOCK, Airdrie (CA) Sep. 8, 2016) discloses, in the Abstract, "A portable lighting system for a drilling rig. The lighting system is designed to withstand the difficult and extreme weather conditions typically experienced in drilling rig environments. The pulley and slider arraignments are designed for minimal friction. The overall pulley design for the lifting of the unit (for, example, the way the cables are orientated) is extremely robust. The outrigger design include fold out and lock in place. The power source can run a duel transfer switch setup powered by an external supply (like the rig power) or from its own 100% backed up generator. Lighting is the lightest and brightest available. Tower is skid mounted and mobile with the use of a truck. Top light banks swivel and tilt."

None of the above provides a base with 1) easily adjustable ballast, 2) easily adjustable attachment to theatrical or temporary truss structures, and 3) efficient installation and position adjustability. What is needed, therefore, is a product that overcomes the above-mentioned limitations and that includes the features enumerated above.

BRIEF SUMMARY

Ballasted Attachment for Temporary Truss Structures or BATTS are used to support Temporary structures typically built in the live event, trade show, and special event marketplace. BATTS provide a quickly deployed, leveled and stable base for which one can mount aluminum box truss too. This allows tower construction equal to the capacity of the truss itself and a flexible outrigger attachment in which many engineering requirements can be achieved. BATTS provide a ballast point to resist the overturn moment and uplift moment of concert roofs and other system that are exposed to environmental conditions. BATTS are constructed from steel and aluminum and possess substantial self-weight.

The disclosed Ballasted Attachment for Temporary Truss Structures are designed for use in Entertainment Lighting and Rigging applications. Typical use involves special events, trade shows, concerts, festival, temporary lighting support/audio support, and particularly for truss tower stabilization. The Ballasted Attachment for Temporary Truss Structures primary purpose is to prevent overturn of truss towers.

The Ballasted Attachment for Temporary Truss Structures primary utilization is for the constructions and stabilization of temporary event lighting towers, concert roofs, audio delay towers and event signage. The BATTS enables a quick installation in a face paced working environment. This is useful for concerts, theatrical performances, trade shows, and special events.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current invention. Where there is a conflict, the following definitions apply.

Temporary Structures—any structure that is intended to be erected for six or less weeks. This includes an assembly of materials to build a load bearing structure with the intent to be used as a support system for other items, to be used as a shelter, to be used for display, to be used for artistic design, or to be used as a performance area or access point.

Ballast—a mass used to secure structures or items from overturn, such as a mass used to resist gravity, wind, or seismic event; a method for anchoring items.

Outdoor Structures—temporary structures set up outdoors.

Theatrical Trusses—object constructed from aluminum or steel usually in a box or rectagonal formation and modular in nature. Constructed using typical truss design of triangle geometry.

Operation

Figure 1:
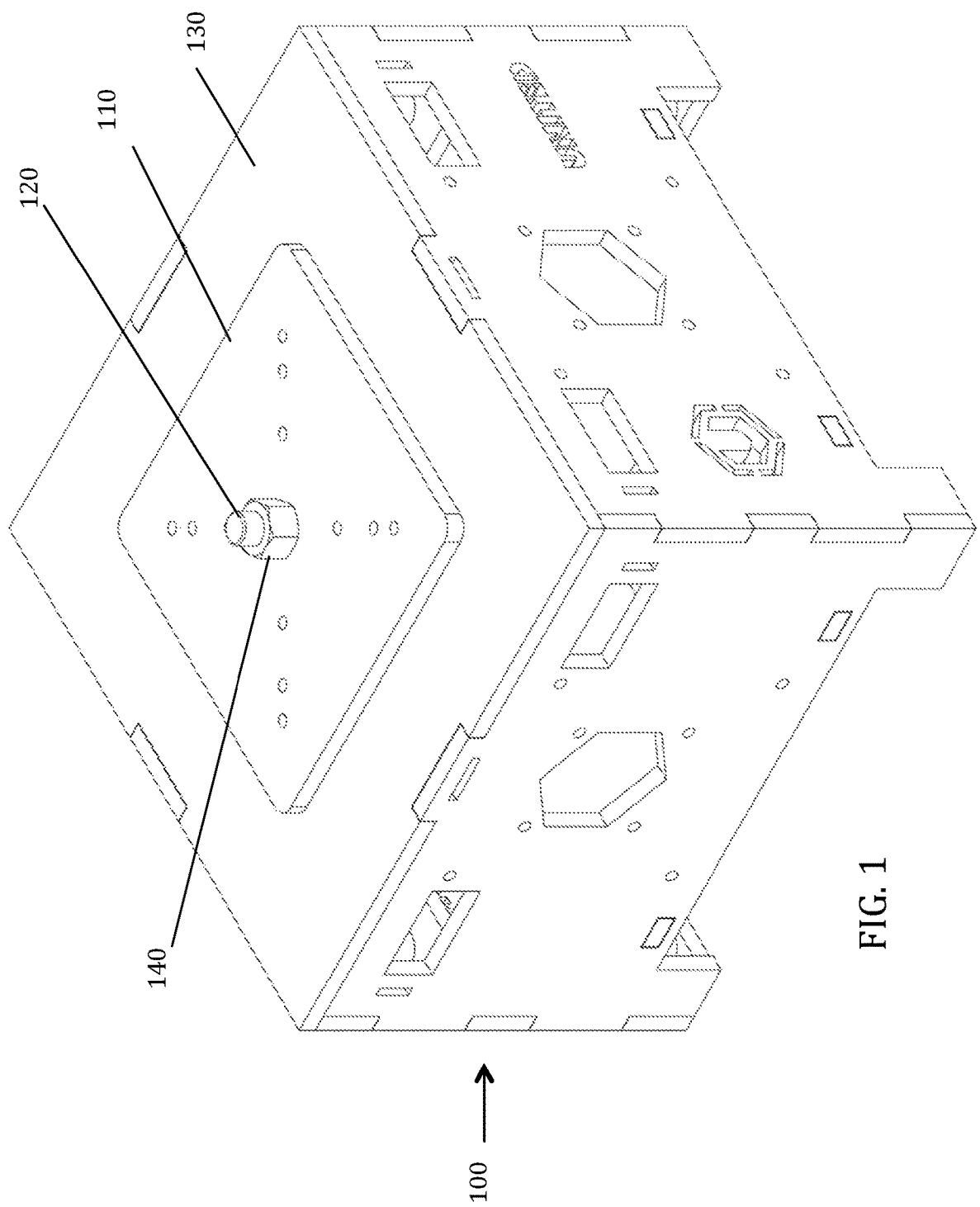
FIG. 1 is an isometric top-down view of the ballast block.

Referring to FIG. 1, the Ballasted Attachment for Temporary Truss Structures 100 (BATTS) ballast block offers end users greater adjustment than other known tower bases. The BATTS is preferably a 1,750 pound cube which can serve as both base and ballast for a connected truss structure. With the BATTS, the end user can place the 1,750 lbs. ballast in a predetermined location and retain adjustability in the base to insure the tower will be in the proper final location. This adjustability comes from the BATTS attachment plate 110. This top connection plate offers a fixed attachment point for the tower while still allowing for 360 degree or adjustability relative to the BATTS base. In a preferred embodiment, the top connection plate also gives the end user the ability to place the Base within 8" of its required location, which is not possible with other ballast bases. This range of motion allows for a quicker set up time of temporary tress structures by as much as 80%.

The BATTS is constructed of plate steel, preferably ranging from ⅜" plate to 1" thick plate. The BATTS may vary in size to accommodate for weight and specific use cases, but in a preferred embodiment is a 3' wide×3' wide×2' high cube. The thickness of the steel plates may be also varied to achieve different final weight of the BATTS.

Figure 2:
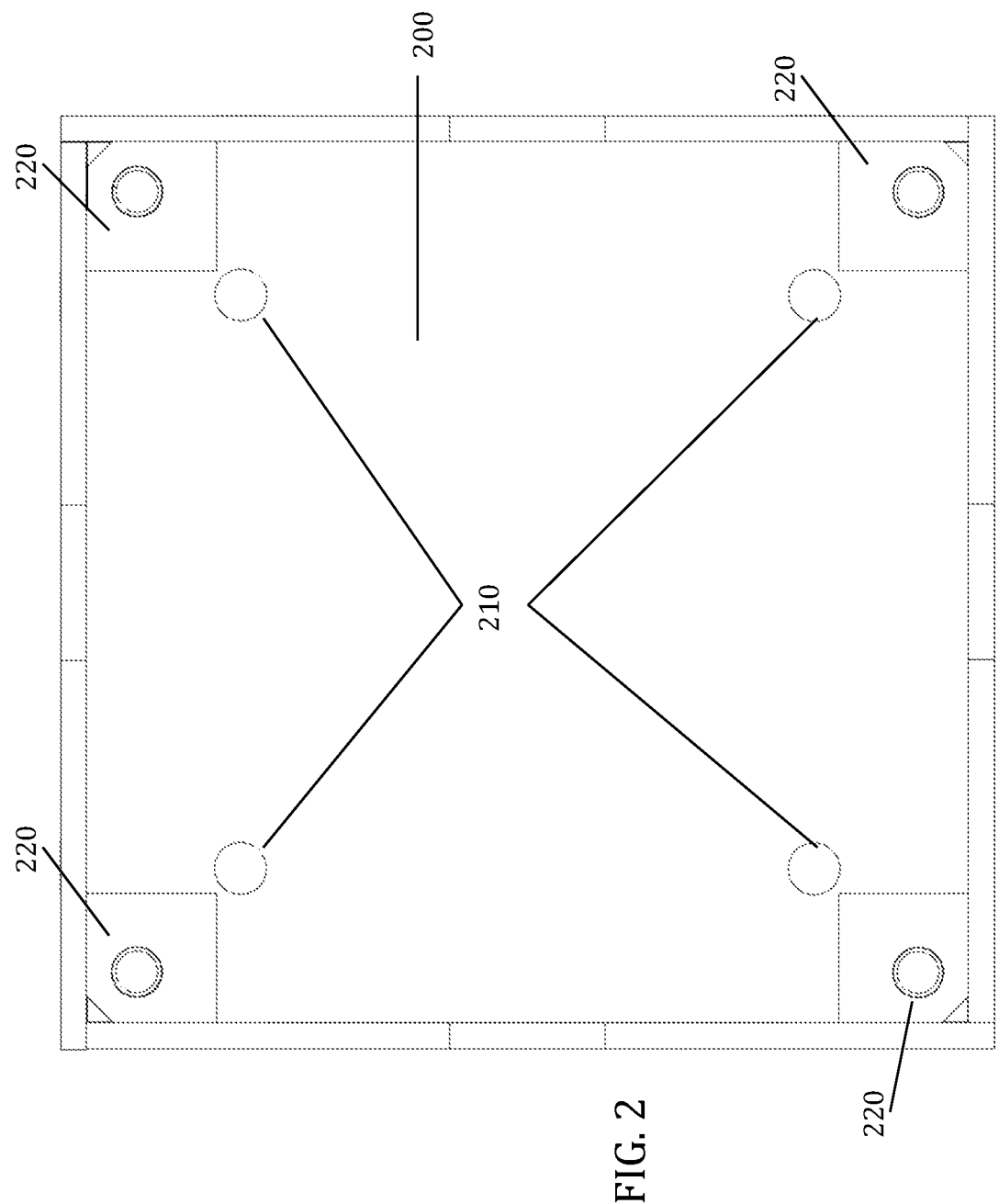
FIG. 2 is an internal top-view of the cube, showing an internal top plate.

Four plates are involved enabling adjustable connection to tresses, including a top inner plate, a sliding plate, a top outer plate, and an attachment plate. Referring also to FIG. 2, top inner plate 200 is internal to the cube and not externally visible. Top inner plate 200 may include one or more (preferably four) drainage holes 210, allowing drainage of any water or liquid from within the cube. Top inner plate 200 may also have cutouts 220 for four tubes encasing screw jacks. The screw jacks and tubes may optionally be shorter and not reach top inner plate 200, in which cutouts 220 in top inner plate 200 are not needed. Top inner plate 200 is preferably ⅜", ½" or 1" thick plate steel, and approximately 33.9 inches square to fit inside the cube. Top inner plate 200 is optionally covered with a sheet of ultra-high-molecular-weight (UHMW) polyethylene plastic for friction reduction.

Figure 3:
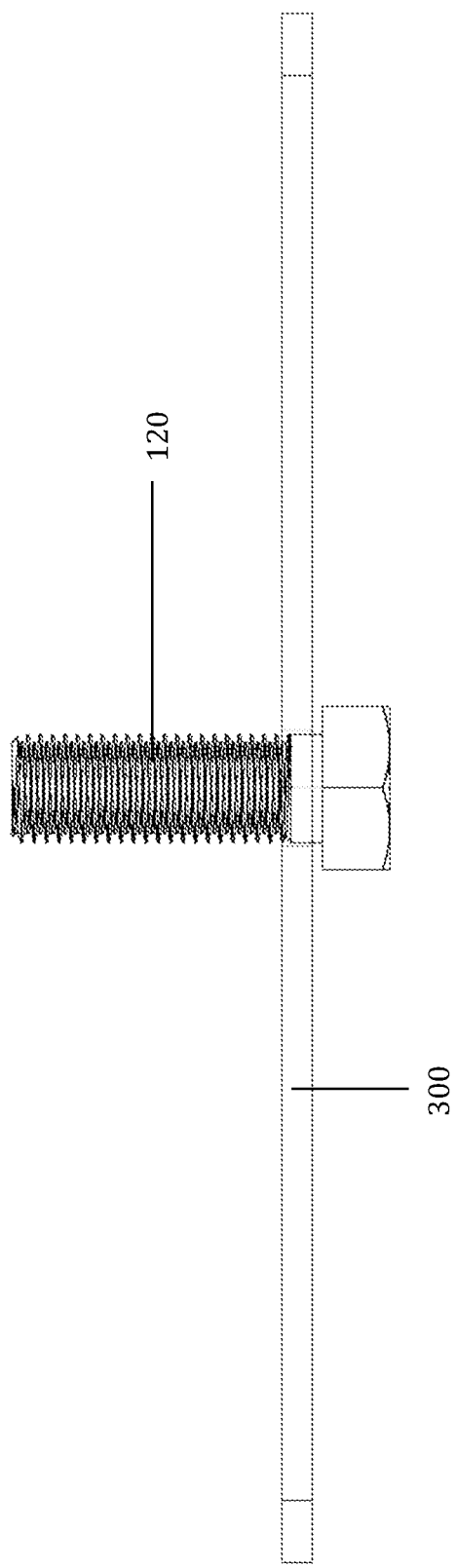
FIG. 3 is a side view of a sliding plate of the ballast block.
Figure 4:
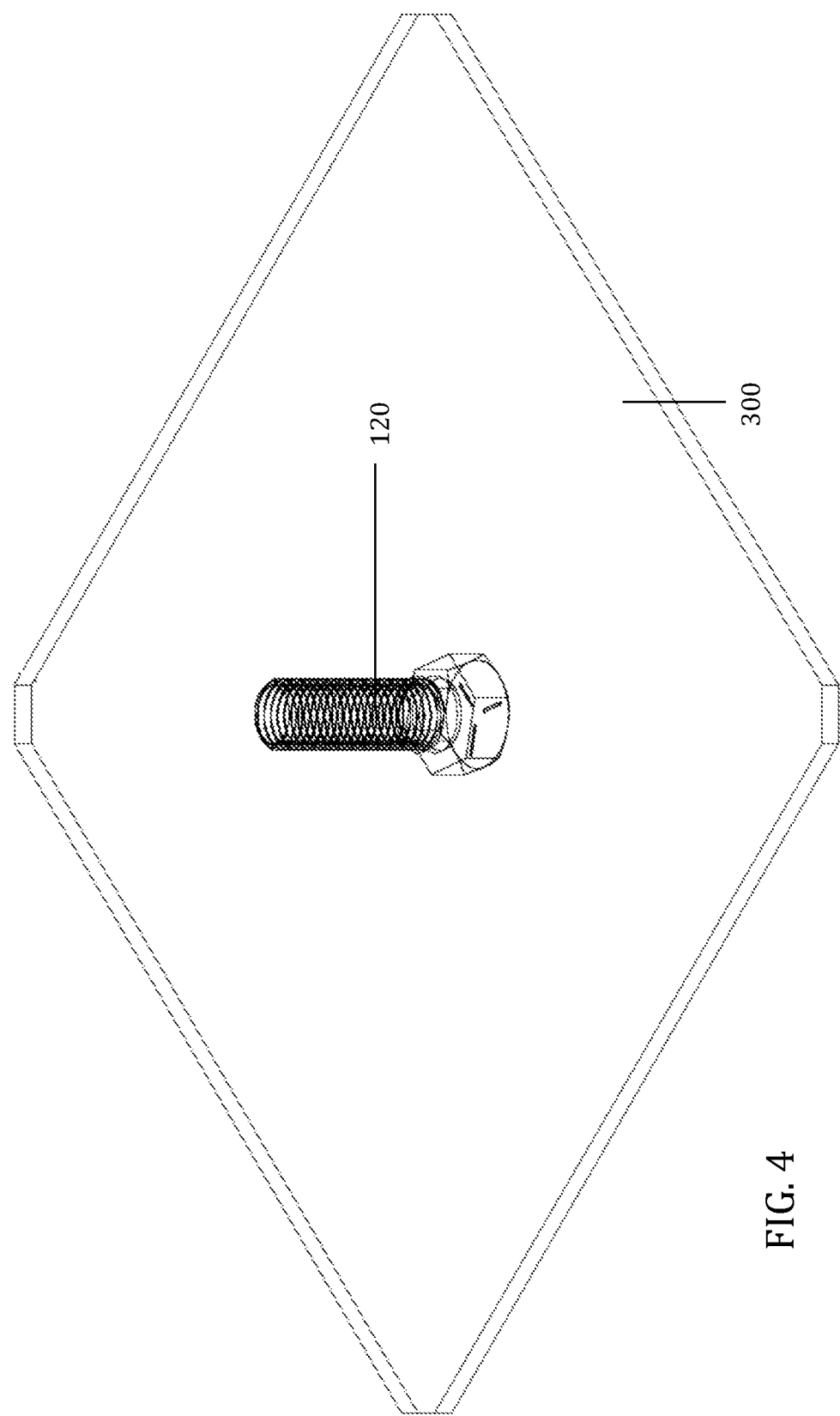
FIG. 4 is an isometric view of the sliding plate of FIG. 3.

Referring also to FIGS. 3-4, above top inner plate 200 (and friction reducing plastic covering, if used) is sliding plate 300 and king pin attachment 120. Sliding plate 300 is preferably 24" in width and length. This preferred embodiment fully supports operation with standard 20.5" truss towers. The sliding plate design allows the user to place the ballast with less accuracy than required by other bases. Corners of the sliding plate may optionally be curved or trimmed. Slidable and rotational positioning is achieved through top inner plate 200, sliding plate 300, a clamping mechanism of bolt 120 and nut 140, top outer plate 130 that captures the sliding plate, and aluminum tower attachment plate 110 which connects directly to a tower. Sliding plate 300 is preferably a ½" thick steel plate. Bolt 120 is preferably a 1.75" grade 5 or 8 structural bolt.

Figure 5:
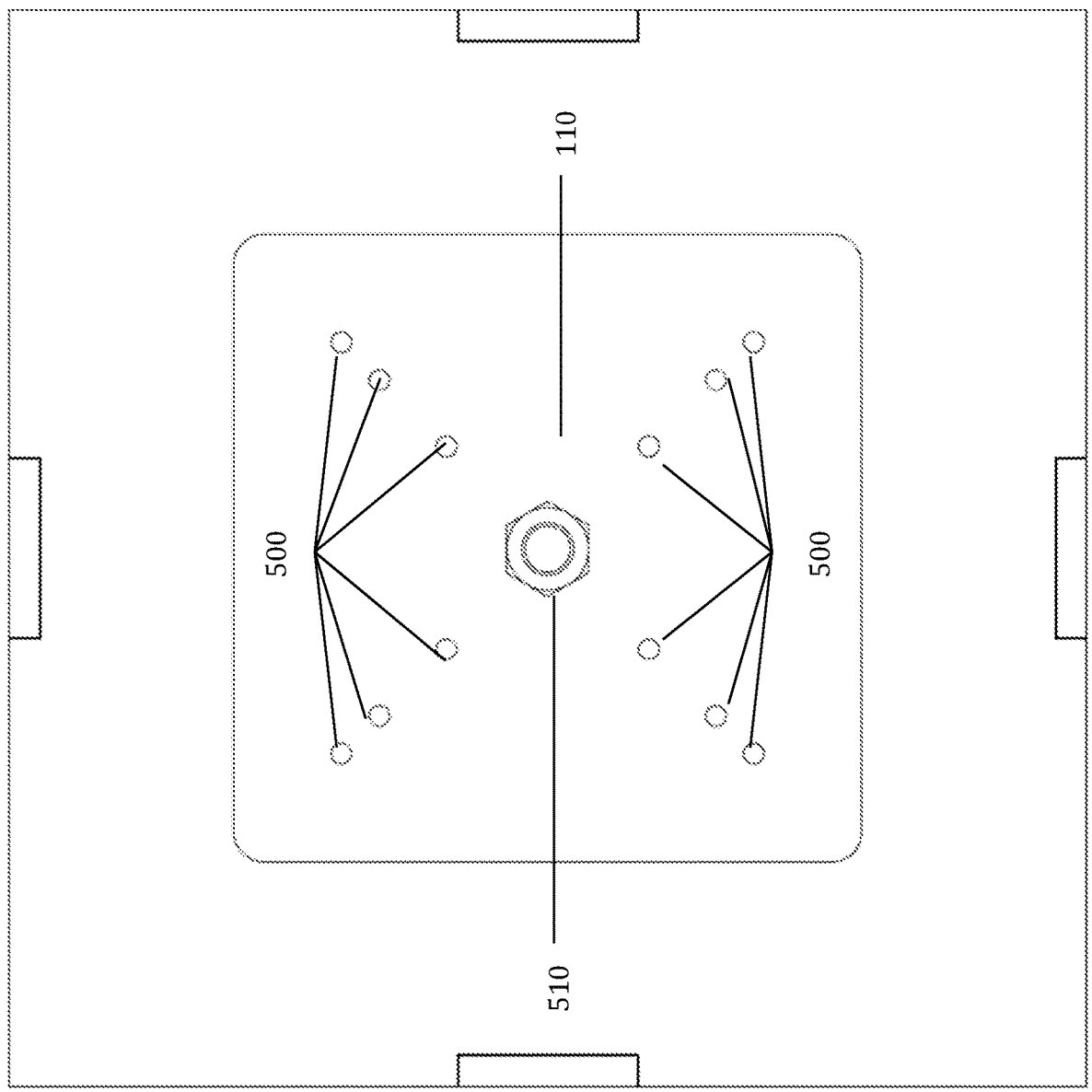
FIG. 5 is a top-down view of the ballast block of FIG. 1.

Referring also to FIG. 5, Tower attachment plate 110 is preferably a 1" thick aluminum plate. One or more connection points 500 are positioned to connect to truss towers. In the preferred embodiment the connection points are connection holes for standard 12"×12", 18"×18", and 20.5"×20.5" box trusses, but alternate hole numbers and alignments may be drilled through attachment plate 110 for connection to other truss sizes or geometry. Alternate connection types, such as built-in bolts, may also be used instead of holes for connection to other truss structures, with the connection type selected and positioned to match required connection to the structured. A center hole 510 in attachment plate 110 is sized to fit around bolt 120 and be clamped by nut 140.

Figure 6:
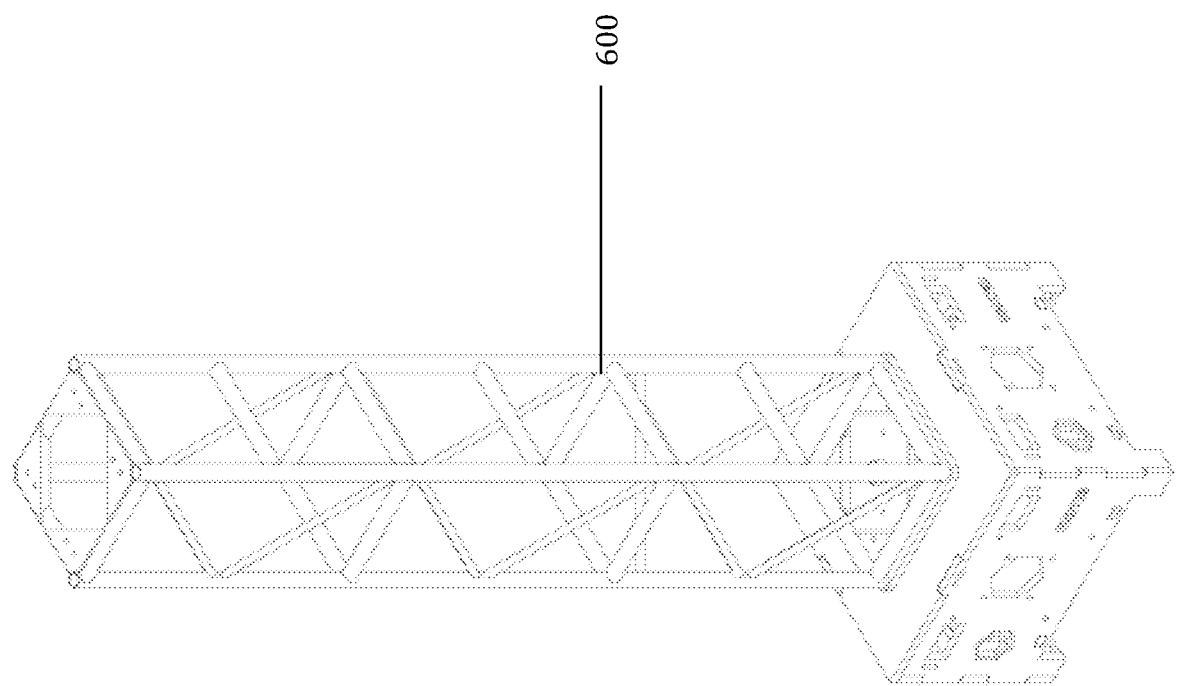
FIG. 6 is an isometric view of the ballast block of FIG. 1 connected to a tower truss.

Referring also to FIG. 6, for installation, tower attachment plate 110 is first bolted or pinned to the base of tower 600. Once the BATTS cube is placed, tower attachment plate 110 and the bottom section of the tower slide over bolt 120 that is connected to sliding plate 300.

Figure 7:
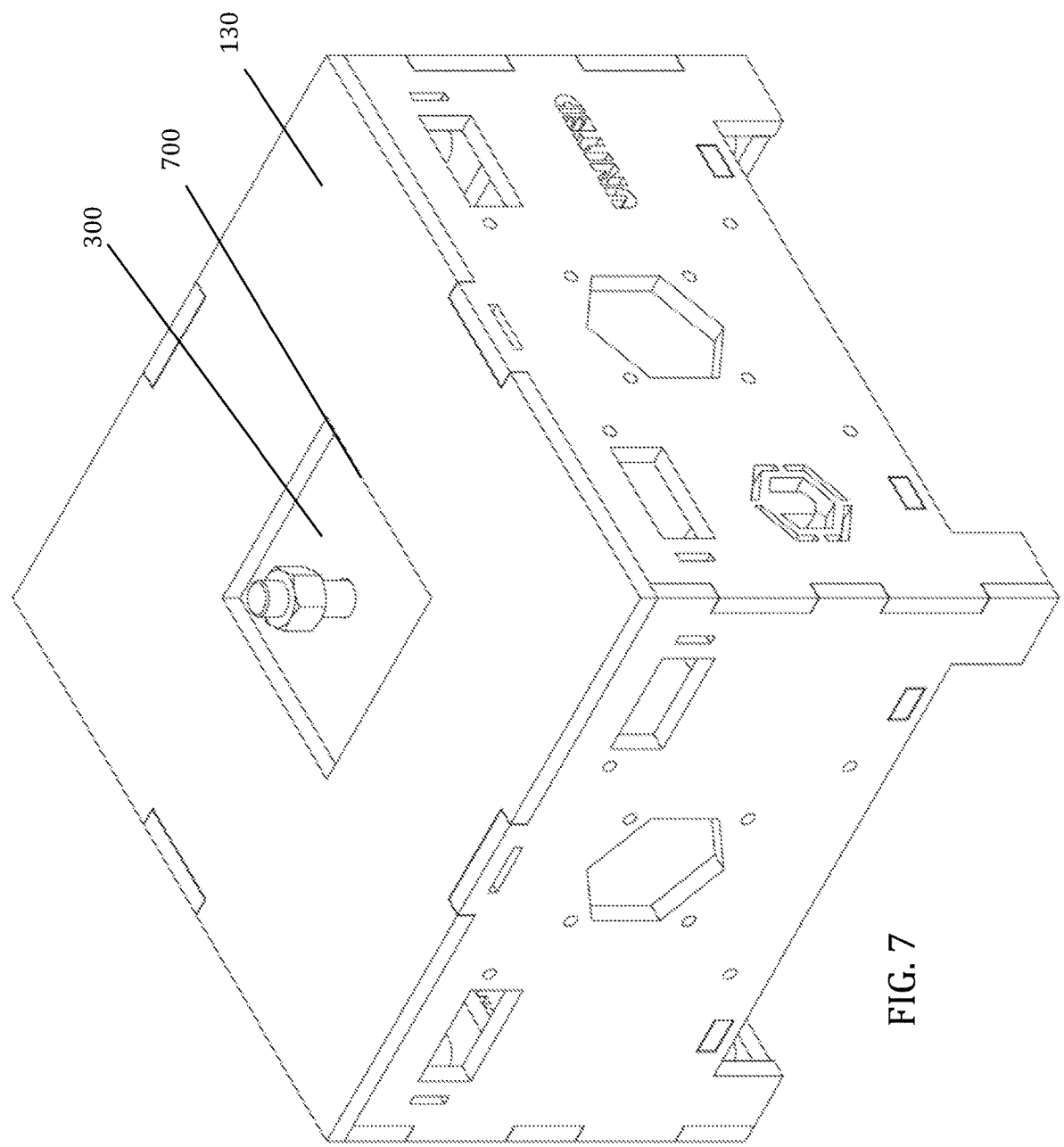
FIG. 7 is the isometric view of FIG. 1 with the attachment plate not shown.

Referring also to FIG. 7 (which shows the BATTS cube without the attachment plate present), sliding plate 300 may be slid and rotated into a needed position without otherwise repositioning the base. Movement is limited by cutout 700 in top outer plate 130. Top outer plate 130 is preferably 1 inch thick plate steel. Cutout 700 is preferably a square with 8 inch long sides, although alternate shapes (such as a circle) or sizes may be used. Once the bottom tower assembly is in place and the horizontal and rotational adjustments have been made, nut 140 can be tightened to engineered torque settings, preferably 300 ft-lbs. With the nut set to the proper torque setting, the BATTS holds the tower in position allowing an end user the full capacity of an aluminum truss tower. The Tower and elements attached to the tower benefit from great stability, uplift resistance, and overturn resistance.

The sides of the cube may be interlocking and fully welded together. Each side panel is preferably 1" thick plate steel, although alternate thickness (such as ½" thick) may be used if alternate end weight and/or size is desired. Non-interlocking sides are also possible, but an interlocking side panel design allows for a stronger welded connection and lower cost of construction.

Figure 8:
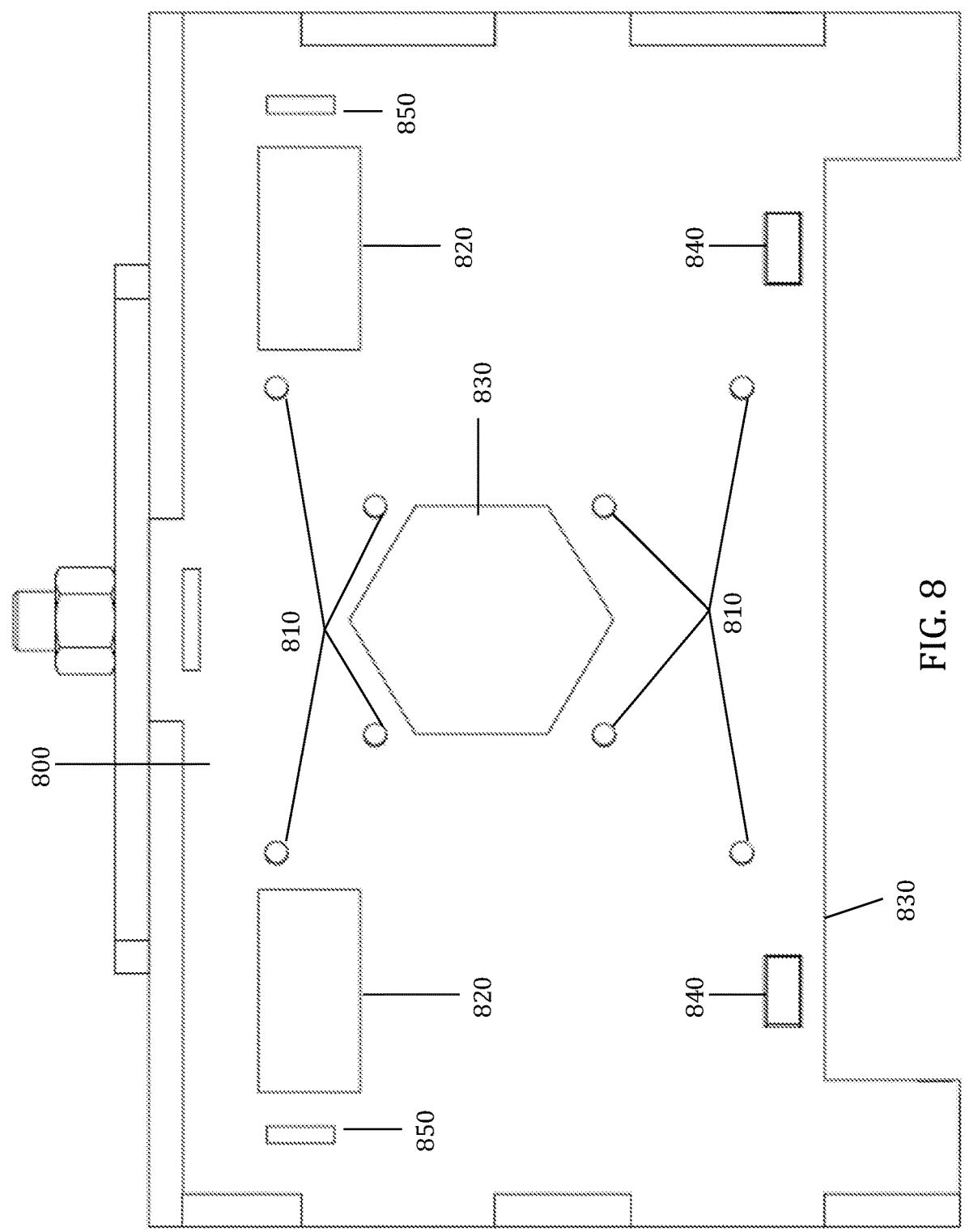
FIG. 8 is a side view of the ballast block of FIG. 1.

Referring also to FIG. 8, each side 800 of the cube have attachment holes 810 for additional trusses and accessories for the purposes of outriggers, hoist attachments, lifting points, tie down points or any additional hardware deemed necessary during the event design process. These convenient attachment locations are primarily used for outriggers which allows for an increased footprint to resist the overturn moment. Attaching a truss to the side of the BATTS can create a connection point locking multiple towers together at their base.

The sides of the BATTS have pockets 820 for fork lift blades as well as a lower elevated relief 830 allowing for warehouse style fork trucks, aka pallet jacks, to get under the base for portability. This allows for safe and quick placement of the BATTS as well as safe and efficient loading and off-loading to and from transport vehicles.

Each side of the BATTS may have one or more small horizontal slots 840. These slots allow for the drainage of water and small debris.

The sides of the BATTS may have one or more small vertical slots 850. These slots may be used to attach a hook or other apparatus to hold each screw jack inside tubes when the unit is being raised via fork truck or other overhead lifting device.

The internal cavity of the cube is normally empty, however it can be filled to add additional weight or lightning elements, which may add lighting effects to the base of a tower. Insertion of internal elements is made through large hole 860 in side panel 800. This increases the versatility of the BATTS through adjustment of the final weight without increasing the overall size.

Figure 9:
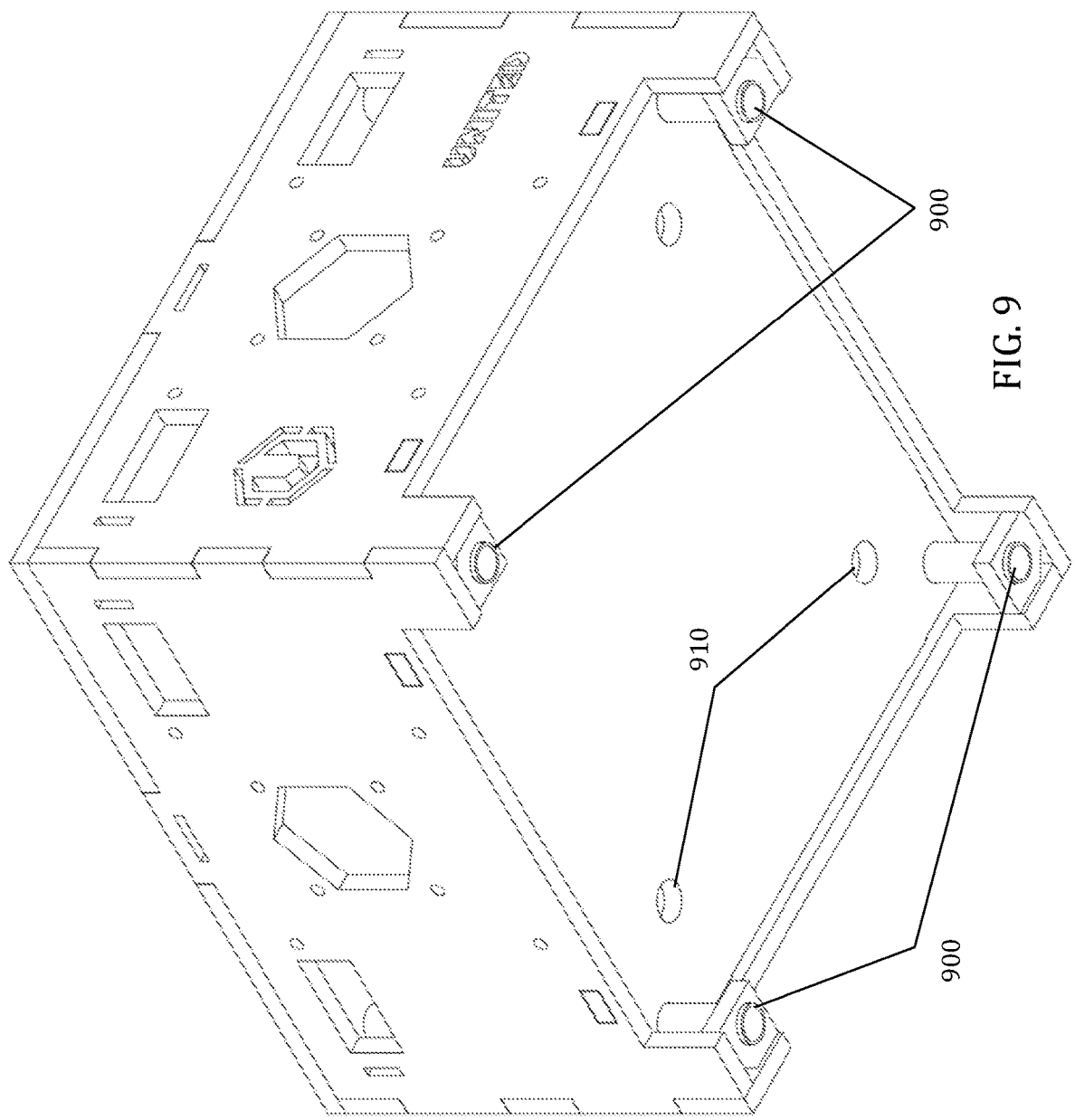
FIG. 9 is an isometric bottom-up view of the ballast block of FIG. 1.

Referring also to FIG. 9, the base of the BATTS may have four tubes 900 to receive Screw Jacks. These screw jacks may be used to level of the Ballasted Attachment for Temporary Truss Structures on uneven terrain.

The bottom inner plate of the Ballasted Attachment for Temporary Truss Structures has one or more (preferably four) holes 910. These holes are in place to allow for drainage of rainwater.

Other Embodiments

While the nut and bolt are a preferred clamping mechanism to connect and clamp into position the sliding plate and attachment plate, alternate clamping mechanism my be used. Requirements for the clamping mechanism include connection between the sliding plate and attachment plate to allow rotation and repositioning when unclamped, and sufficient clamping strength to prevent any rotation, repositioning, or tilting of an attached tower when clamped.

While the preferred embodiment includes attachment holes, pockets, vertical and horizontal slots, and a large hole in each side, any or all can alternatively be removed from one or more sides. Removal reduces functional flexibility by reducing (or completely removing) the number of sides where connection, draining, lifting for movement, and filling are possible, but removal does not prevent intended function as a ballast block.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A ballast base for supporting truss towers, the base comprising:
   a cube;
   a top inner plate within the cube;
   a top outer plate of the cube positioned above the top inner plate, wherein the top outer plate has a cutout region;
   a slidable plate between the top inner plate and the top outer plate; an attachment plate with one or more connection points for connection to a truss tower; and
   a clamping mechanism connecting the slidable plate and the attachment plate, wherein rotation and sliding of the slidable plate and the attachment plate is possible when unclamped, and the slidable plate and the attachment plate are fixed in position relative to each other and the cube when clamped.

2. The ballast base of claim 1, wherein the clamping mechanism is a nut and bolt.

3. The ballast base of claim 2, wherein the bolt is a 1.75 inch grade 5 or grade 8 structural bolt.

4. The ballast base of claim 1, wherein the cube is 3 feet wide by 3 feet long by 2 feet high.

5. The ballast base of claim 4, wherein the cube weighs 1,750 pounds.

6. The ballast base of claim 1, wherein the top inner plate, the top outer plate, a bottom plate of the cube, and four side panels of the cube are each 1 inch thick plate steel.

7. The ballast base of claim 1, wherein the cube has four interlocking side panels welded together.

8. The ballast base of claim 7, wherein each side panel has two or more pockets for fork lifts.

9. The ballast base of claim 7, wherein each side panel has a lower elevated relief for pallet jacks.

10. The ballast base of claim 7, wherein each side panel has one or more horizontal slots for drainage.

11. The ballast base of claim 7, wherein each side panel has one or more vertical slots for hooks to hold screw jacks in place.

12. The ballast base of claim 7, wherein each side panel has a central hole for accessing an internal cavity of the cube.

13. The ballast base of claim 1, wherein the sliding plate is 24 inches wide by 24 inches long.

14. The ballast base of claim 1, wherein the top inner plate is covered with an ultra-high-molecular-weight (UHMW) polyethylene plastic.

15. The ballast base of claim 1, wherein the cutout of the top outer plate is a square with 8 inch long sides.

16. The ballast base of claim 1, wherein the cube has a bottom plate with four tubes passing through vertically, each tube holding a screw jack for leveling the cube.

17. The ballast base of claim 16, wherein the cube has a bottom plate with one or more drainage holes.

18. The ballast base of claim 1, wherein the top inner plate has four tubes passing through vertically, each tube holding a screw jack.

19. The ballast base of claim 1, wherein the top inner plate has one or more drainage holes.

* * * * *